Patented Sept. 20, 1927.

1,643,012

UNITED STATES PATENT OFFICE.

CHARLES B. HILL, OF GLENCOE, AND GEORGE L. TINTNER, OF CHICAGO, ILLINOIS, ASSIGNORS TO NORTHWESTERN YEAST COMPANY, OF CHICAGO, ILLINOIS, A CORPORATION OF ILLINOIS.

PROCESS OF MAKING BREAD.

No Drawing. Application filed October 26, 1925. Serial No. 65,054.

This invention relates to bread making with commercial compressed yeast. The object of the invention is to provide a new method of so handling compressed yeast that either the amount of yeast required is substantially reduced, the time for bread making being the same as at present, or the time for bread making is materially reduced, the same amount of compressed yeast being used.

In commercial bake shop methods, bread has heretofore been produced with compressed yeast, by the so-called straight dough method in approximately six hours; and by the sponge method in approximately six and three-quarters hours.

Broadly stated, the invention consists in first treating compressed yeast, before it is added as usual in a sponge or dough containing the flour and other ingredients used in making bread, in a solution containing water and suitable yeast nourishing materials, preferably but not necessarily part of the materials which would ultimately go into the finished bread product, under such conditions that the solution can act on the yeast for a period ranging from one to fifteen hours, preferably the latter, under conditions of temperature and the like which in no way waste the time of an operative nor require plant equipment nor space materially different from that heretofore used in bread making, the result of the treatment of the yeast with said solution being the formation of what is hereafter referred to as a "starter" which when applied to the regular ingredients entering the bread produces finished bread by either of the standard well known methods, viz: the sponge or dough methods, with the advantages heretofore set forth in regard to the period of breadmaking time or yeast saved, this in either case being done with no reduction in the quality of the bread.

The usual baking procedure is to incorporate the yeast-nourishing materials in either the sponge or dough, whereas here, in contrast, the yeast-nourishing materials are used to stimulate and increase the compressed yeast, first and separately, before the compressed yeast is added to either the sponge or dough.

In its preferred form, the invention consists in the discovery of a new formula and method of making bread by which commercial compressed yeast is nourished and grown and put in best condition in a starter for use in further bread making processes, the materials used in the starter being ordinarily only a part of those required anyway in the finished bread product, and the character of action of said materials in the starter being such that although the starter requires preferably about fifteen hours for preparation, it can, for practical purposes, be left to itself during that period, thus avoiding in any way increasing the labor or other costs to the commercial baker or cutting into the bake shop time schedules.

The invention further consists in the production of such a starter which, after the approximate fifteen hours required to put the yeast in best condition, may be used at once (or at any time later up to forty-eight hours, as hereinafter described) with either the sponge or straight dough methods of breadmaking, the fermentation period for the sponges or doughs being with the same amount of yeast used much less than heretofore or with which, on the same time schedule, much less yeast is required.

With the foregoing facts in mind, the nature of the invention will be seen from the following illustrative example, which is within the scope of the invention, but to which we are not limited as to components, qualitatively or quantitatively:

Formula.

Into a suitable container, put 3.5 grams sucrose, glucose or other suitable sugar, and 1.75 grams of an inorganic yeast food on an organic filler for base, as ammonium sulphate, $(NH_4)_2SO_4$, 2 parts; calcium phosphate, $Ca_3(PO_4)_2$, one part; calcium sulphate $CaSO_4.2H_2O$, one part, and starch 6 parts, or any suitable yeast nourishing material, or combinations of materials, either organic, as asparagine, or inorganic, as ammonium sulphate, in nature, and 120 cubic centimeters of water at 90° Fahrenheit, and stir until materials are dissolved as much as possible. Add 3.5 grams of commercial malt extract or malt of the quality ordinarily used in the baking trade, and stir until dissolved. Then add 7 grams of commercial compressed yeast. Stir well, cover loosely and let stand (usually over night or for about 15 hours) at a temperature of 80-90 degrees Fahrenheit, with due regard for prevention from contamination with bacteria, initially and thereafter, thus completing the herein referred to "starter".

As indicated, the preferred method is to use in the starter yeast nourishing materials, usually commercially entering into the composition of the bread but other materials may be used, among them: potato water or potato flour, or inorganic salts, as ammonium sulphate or calcium sulphate.

If the baker, commercial or home, does not in practice use yeast food or malt extract or a substitute therefor in his or her bread, they may be omitted, either singly or together, as the case may be, from the starter; but the loaves then require longer proofing time.

This "starter" mixture, after standing the time indicated, is used in lieu of compressed or any other yeast, in making sponges or doughs, of course, stirring it well before using. Proceed now as follows: Place in a suitable container 6.5 grams sucrose or glucose, 5¼ grams salt and 97 cubic centimeters water at such temperature that the final temperature of the dough will be 80-83 degrees Fahrenheit, consideration being given to the room and flour temperatures and friction from the mixer. Place in a mixing bowl 350 grams flour and add the above yeast mixture, mixing slowly until lumps form; then add the sugar and salt solution and mix at faster speed; then add 5¼ grams lard and mix at high speed. (Note: Total mixing time is five minutes.) Place the dough in a greased container of suitable size; cover and let rise at 80-83 degrees Fahrenheit. After 90 minutes, knead the dough down; 60 minutes later, knead the dough down again; 30 minutes later, knead the dough down again. Now mould 18 ounces of the dough into a loaf; cover and place in a proofing cabinet at 102 degrees Fahrenheit. Let the loaf rise for 1 hour and 40 minutes and then bake it in an oven at a temperature of 450 degrees Fahrenheit for 30 minutes.

The amount of yeast used in the above formula is equal to 2% of the weight of the flour. The usual time for making bread with compressed yeast with standard straight dough formula, using an amount of compressed yeast equal to 2% of the weight of the flour, is about 6 hours. With the above formula of this invention, the time is reduced about 45 minutes, as compared with the standard straight dough process formula.

The above formula may be changed as follows:

(1) With the straight dough process, leaving the total time for making bread about 6 hours, the amount of yeast used may be reduced about one-half.

(2) With the sponge process, the amount of yeast may be reduced about one-half, providing the proofing time is increased about 15 minutes.

(3) With the sponge process, using an amount of yeast equal to 2% of the weight of the flour, the time for making bread may be reduced about 1 hour, as compared with standard sponge process formula.

This formula and method does not increase the number or amounts of ingredients usually used by bakers, but gives a new way of making bread, whereby certain yeast nourishing ingredients required by bakers in their doughs or sponges, are dissolved in about one-half of the water to be used in making the bread and the compressed yeast is then placed in this yeast nourishing solution and allowed to increase in strength and amount, practically without attention, under proper conditions of temperature, for about 15 hours, by which time the yeast is in best condition. Starter may be used after standing about one hour, but this increases the time some, and does not make quite as good a loaf of bread.

Comparative results and apportionment of materials in old bread making methods compared with those of this invention are without limiting ourselves to the materials and formulæ given herein, clearly shown in the two following tables:

*Formulæ for making bread with straight dough process.*

|  | Standard formula. Compressed yeast at 2% of amount of flour. | Starter formula. This invention compressed yeast at 2% of amount of flour. | Starter formula. This invention compressed yeast at 1% of amount of flour. |
|---|---|---|---|
| *Temperatures (° F.).* | | | |
| Temperature water in starter. | None | 90 deg. | 90 deg. |
| Temperature room where starter stands. | None | 80-90 deg. | 80-90 deg. |
| Temperature dough when mixed. | 80 deg. | 80-83 deg. | 80-83 deg. |
| Temperature for proofing. | 102 deg. | 102 deg. | 102 deg. |
| *Ingredients in starter.* | | | |
| Compressed yeast | None | 7 grams | 3.5 grams. |
| Sugar | None | 3.5 grams | 3.5 grams. |
| Malt | None | 3.5 grams | 3.5 grams. |
| Yeast food | None | 1.75 grams | 1.75 grams. |
| Water | None | 120 c. c. | 120 c. c. |
| *Ingredients in dough.* | | | |
| Compressed yeast | 7 grams | Above starter. | Above starter. |
| Sugar | 10 grams | 6.5 grams | 6.5 grams. |
| Malt | 3.5 grams | None | None. |
| Yeast food | 1.75 grams | None | None. |
| Water | 217 c. c. | 97 c. c. | 97 c. c. |
| Flour | 350 grams | 350 grams | 350 grams. |
| Salt | 5.25 grams | 5.25 grams | 5.25 grams. |
| Lard | 5.25 grams | 5.25 grams | 5.25 grams. |
| 1st punch | 145 min. | 90 min. | 145 min. |
| 2nd punch | 70 min. | 60 min. | 70 min. |
| To the bench | 20 min. | 30 min. | 20 min. |
| Proof for about | 1 hr. 25 min. | 1 hr. 40 min. | 1 hr. 25 min. |
| Total time, aside from 1 to about 15 hours starter stands. | About 6 hrs. | About 5¼ hrs. | About 6 hrs. |

Total materials—same in each case, except for reduction in yeast. No attention required during 1 to about 15 hours starter stands.

*Formulæ for making bread with sponge process.*

|  | Standard formula. Compressed yeast at 2% of amount of flour. | Starter formula. This invention compressed yeast at 2% of amount of flour. | Starter formula. This invention compressed yeast at 1% of amount of flour. |
|---|---|---|---|
| *Temperatures (°F.)* | | | |
| Temperature water in starter. | None | 90 deg | 90 deg. |
| Temperature room where starter stands. | None | 80–90 deg | 80–90 deg. |
| Temperature sponge when mixed. | 80 deg | 80–83 deg | 80–83 deg. |
| Temperature dough when mixed. | 80 deg | 80–83 deg | 80–83 deg. |
| *Ingredients in starter.* | | | |
| Compressed yeast | None | 7 grams | 3.5 grams. |
| Sugar | None | 3.5 grams | 3.5 grams. |
| Malt | None | 3.5 grams | 3.5 grams. |
| Yeast food | None | 1.75 grams | 1.75 grams. |
| Water | None | 120 c. c | 120 c. c. |
| *Ingredients in sponge.* | | | |
| Compressed yeast | 7 grams | Above starter | Above starter. |
| Malt | 3.5 grams | None | None. |
| Yeast food | 1.75 grams | None | None. |
| Flour | 350 grams | 350 grams | 350 grams. |
| Water | 217 c. c | 97 c. c | 97 c. c. |
| Weigh out from above sponge for 1 1¼ loaf. | 316 grams | 316 grams | 316 grams. |
| Time sponge stands | 4 hours | 3 hours | 4 hours. |
| *Ingredients in dough.* | | | |
| Above sponge | 316 grams | 316 grams | 316 grams. |
| Sugar | 10 grams | 6.5 grams | 6.5 grams. |
| Water | 75 c. c | 75 c. c | 75 c. c. |
| Flour | 130 grams | 130 grams | 130 grams. |
| Salt | 5.25 grams | 5.25 grams | 5.25 grams. |
| Lard | 5.25 grams | 5.25 grams | 5.25 grams. |
| Time dough stands | 15 min | 15 min | 15 min. |
| Then goes to | Bench | Bench | Bench. |
| Proof for about | 1 hr. 40 min | 1 hr. 40 min | 1 hr. 40 min. |
| Total time, aside from 1 to 15 hrs. starter stands. | 6 hr. 46 min | 5 hr. 50 min | 7 hours. |
| Total materials required. | Standard | Same | Same, except less yeast. |

No attention required during the 1 to about 15 hours that starter stands.

*Miscellaneous advantages.*

When the yeast-nourishing ingredients and the water used in the starter are part of the materials usually used in bread-making, there is no increased cost to the baker for materials. When, however, other liquids and materials are used in the starter, no great additional expense, if any, is incurred.

The starter is easily made and requires from one to fifteen hours for its preparation, during which time, for practical purposes, it can be left to itself, thus avoiding any increased cost for labor.

For emergency work, the starter may be used after standing one hour, but the quality of the bread is then not quite as good as when the starter stands 15 hours.

The bread made by the process of this invention is equal in quality to that made with standard compressed yeast methods, either the straight dough, sponge or quick time processes or any process that we know of.

After the fifteen hour period required for the compressed yeast in the starter to be nourished and increased in strength and quantity, the following savings in time or amount of yeast may be made, compared with the usual method of using compressed yeast.

With the straight dough method:

1. The amount of yeast may be reduced about one-half and the time for fermentation period left the same.

2. Using the regular amount of compressed yeast, the fermentation period may be reduced about 40 minutes.

With the sponge process:

3. The amount of yeast may be reduced about one-half, providing the proofing time is increased 15 minutes.

4. Using the regular amount of compressed yeast, the time for the fermentation period may be reduced about one hour.

After the 15 hour period, the starter may be kept for 48 hours in a refrigerator, and then, by raising its temperature to 80 to 82° F., it may be used the same as freshly fermented starter.

The starter stands at 80 to 90 degrees for about 15 hours and is then ready for use. This temperature is the ordinary dough-room temperature maintained by bakers.

Variations in quality of compressed yeast are overcome by the treatment the compressed yeast receives in this starter.

Low grade flours may be used, with compressed yeast treated according to the process of this invention, the results being much better than when the same grade of flour is used with compressed yeast in its regular marketable form. As low grade flour has a poorer quality or a lesser amount of gluten, or both, than high grade flour, it is more benefited, in proportion, than high grade flour, when used with compressed yeast, treated by the starter process of this invention.

We do not limit ourselves to advance yeast food, as other suitable yeast foods may be used.

Suitable yeast foods may be added in the sponge or dough instead of the starter, but best results are not so obtained.

We do not limit ourselves to malt extract singly or in combination with the yeast food.

The terms "malt", "malt extract", and "commercial malt extract" as used in the specification mean either malt flours, malt products, or malt extracts in any form.

The use, generically of a composition of matter compose of ammonium sulphate, calcium sulphate, calcium phosphate, $(Ca_3(PO_4)_2)$ in bread making is set forth and claimed in Hill and Givens' application Serial Number 160,299 filed January 10, 1927.

Where, in the specification and claims, reference is made to "yeast multiplying", or "the number of cells increasing", or the "yeast being strengthened", it is to be understood that such operations are to be conducted at proper temperatures which are recognized and well known by those conversant with the art of growing yeast and by those familiar with the art of bread making.

Having thus described our invention, what we claim as new and desire to secure by Letters Patent is:

1. The step in the process of making bread dough which consists in adding wet live yeast to a suitable yeast nourishing medium of ammonium sulphate, calcium phosphate ($Ca_3(PO_4)_2$) calcium sulphate, malt extract and sugar, and allowing this mixture to stand a sufficient length of time for the yeast cells to multiply greatly and become strengthened preparatory to using them in the dough in place of the usual dough requirements of yeast, yeast foods, yeast activators, malt extract and some of the sugar.

2. The herein described method of making bread with wet yeast which consists in taking a portion of the predetermined total of yeast nourishing materials which ultimately go into a predetermined unit of dough, to wit, the malt extract, the yeast nourishing foods and activators, the wet yeast, some of the sugar and some of the liquid, and then using these to strengthen and increase the number of yeast cells, then incorporating this product with the balance of the predetermined dough unit whereby the completed dough is produced more quickly than is customary in commercial straight dough or sponge methods and the bread derived therefrom is not weakened in quality.

3. The herein described method of making bread with wet yeast which consists in taking a portion of the predetermined total of yeast nourishing materials which ultimately go into a predetermined unit of dough, to wit, the malt extract, the yeast nourishing foods and activators, the wet yeast reduced in quantity about one-half, some of the sugar and some of the liquid, and then using these to strengthen and increase the number of yeast cells, then incorporating this product with the balance of the predetermined dough unit, whereby the completed dough is produced with substantially half the usual initial yeast requirement in the usual time at no expense in quality of the bread derived therefrom as compared with commercial straight dough or sponge methods.

In witness whereof, we have hereunto subscribed our names.

CHARLES B. HILL.
GEORGE L. TINTNER.